Patented Apr. 28, 1942

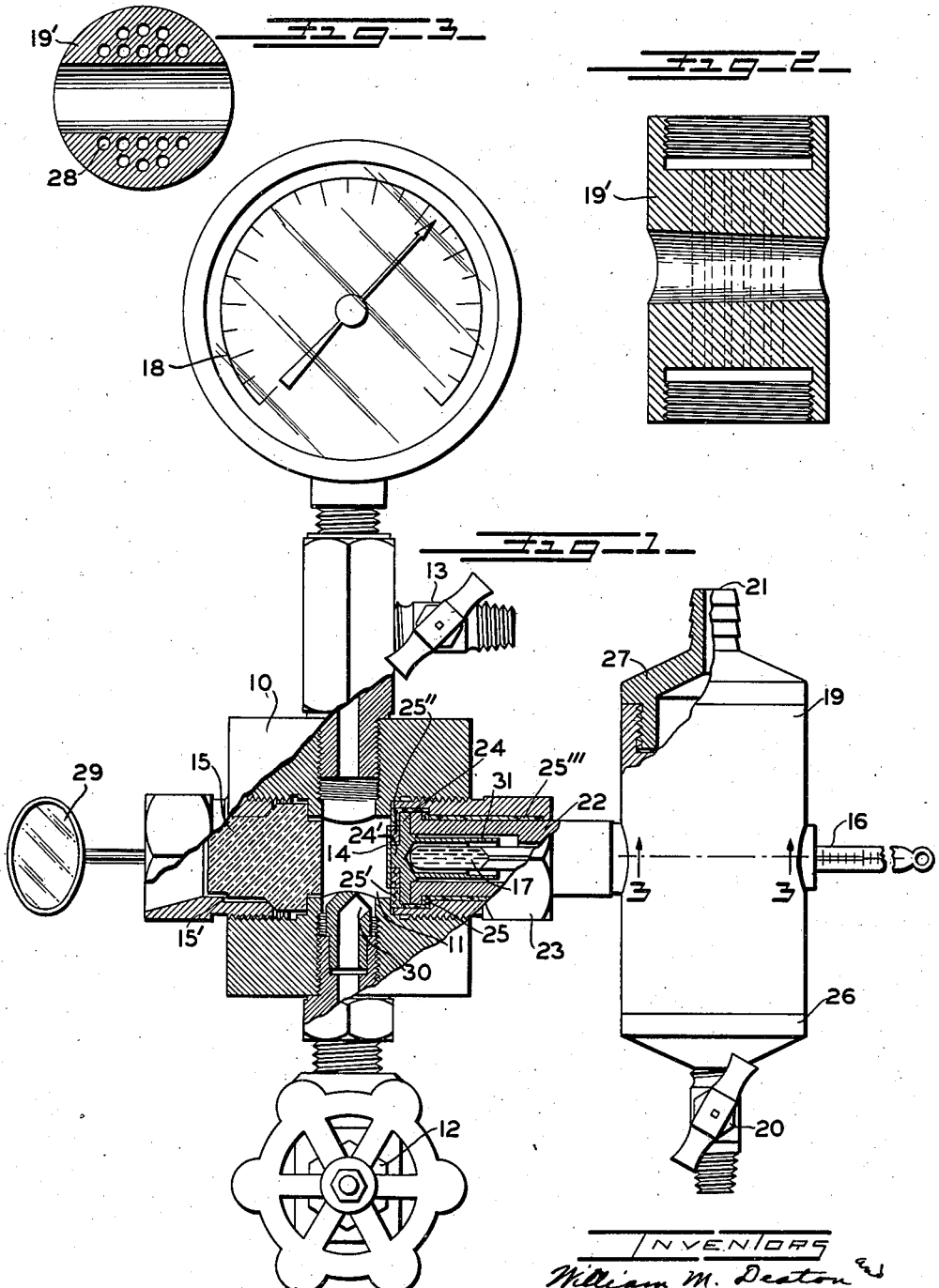

2,281,418

UNITED STATES PATENT OFFICE 2,281,418

APPARATUS FOR DETERMINING THE DEW POINT OF GASES UNDER PRESSURE

William M. Deaton and Ellis M. Frost, Jr., Amarillo, Tex.

Application October 14, 1939, Serial No. 299,440

6 Claims. (Cl. 73—51)

(Granted under the act of March 3, 1883, as amended April 30, 1928; 370 O. G. 757)

The invention described herein may be manufactured and used by or for the Government of the United States for governmental purposes without the payment to us of any royalty thereon, in accordance with the provisions of the act of April 30, 1928 (ch. 460, 45 Stat. L. 467).

This invention pertains, as indicated by the title, to means for determining the dew-point of gases under pressure, and is suitable for use with practically any gas at any pressure from subatmospheric to the maximum pressure for which the device is constructed, but is intended primarily for determining the water dew-point of natural gases under pressure and other types of dew-points, such as hydrocarbon or gasoline dew-points.

Knowledge of the temperature to which a gas under-saturated with respect to water vapor may be cooled before the water will begin to condense is desirable, and frequently is necessary, in many research and industrial activities. This temperature, the dew-point, is a particularly important factor in high pressure gas transmission as water condensate may interfer with the flow of gas in the line. Sometimes this interference is due only to the presence of liquid water; and other times, under certain conditions of pressure and temperature, the condensed water combines with the gas to form solid gas hydrates. These solid compounds may collect in sufficient quantity to reduce materially the carrying capacity of the pipe line or even to plug the line completely.

In connection with the study of gas hydrates and their relation to pipe line operation, it was found desirable to determine the dew-point of the gases that were being studied. The prior art disclosed many devices for such purposes, some of which may be proven satisfactory under less exacting requirements, but none of which was considered to be sufficiently simple, dependable, and accurate for the purpose at hand.

The apparatus of the present invention accordingly was designed to meet, for example, the necessary requirements of precision or reproducibility of determinations, accuracy, safety, and suitability for use with natural gas under pressure, and broadly comprises a chamber through which gases under pressure may be passed, visible dew indicating means within said chamber, pressure indicating means operatively associated with said chamber, and chilling means and temperature indicating means effectively associated with said dew indicating means.

Other desirable features of the present invention not found in the prior art are simplicity of design and ease of construction and operation. Tests with the apparatus herein described and claimed indicate that these requirements and desirable features have been met satisfactorily.

Other objects and functions will become apparent from the following description, it being understood that the above statement is intended to generally explain the invention without limiting the same in any manner.

In the accompanying drawing, illustrative of an embodiment having the characteristics of our invention and by which the same may be practiced—

Figure 1 is an elevational view, sectionalized to show the interior of the device;

Figure 2, a vertical section through element 19 of Figure 1; and

Figure 3, a cross-section taken at line 3—3 of Figure 1.

ELEMENTS AND THEIR ASSOCIATION

By reference to the drawings it will be seen that a practical embodiment of the invention comprises a block-like member 10 provided with an interior chamber 11 into which gases may be admitted for testing through a shut-off valve 12, and exhausted through a control valve 13. Within the chamber 11 is mounted an element 14 having a highly polished surface to which dew or frost will readily adhere when the gases under test reach the dew-point. In order that this surface may be seen or watched for the formation or collection of dew or frost, or watched for its disappearance, a window 15 of suitable transparent material is provided in the block 10. For indicating the temperature of the surface upon which the dew forms a thermometer 16 is mounted with its bulb 17, containing a thermally expansive medium, in a thermometer-well fitting 24 mounted in a wall of the chamber 11, in a manner whereby the bulb is insulated from the wall and shielded from exposure to the gases to be tested, yet effectively positioned with respect to element 14. Means other than a thermometer, for determining the temperature, may be satisfactorily employed, such as a thermocouple. A suitable gauge 18 operatively communicating with the chamber is provided for indicating the pressure of the gases to be tested.

A chiller unit 19 provided with an intake throttle valve 20 and an exhaust port 21 for the passage of cooling vapors therethrough is also provided. Associated with the chiller unit is a high thermal conductivity copper cooling tube 22 so mounted as to be affected by the functions of the chiller unit. This cooling tube 22 surrounds the thermometer 16, is secured projectingly into the wall of the block by means of a retaining nut 23, and carries at the inner end thereof the thermometer-well-fitting 24.

*Details of construction and assemblage of elements*

Details of a practical embodiment for carrying out our invention will now be described.

The valve 12 is preferably a quarter-inch valve while valve 13 is preferably a small needle valve for the reasons pointed out more specifically hereinafter.

Element 14, referred to hereinafter as a mirror, for the collection and indication of dew or frost, may be suitably formed of stainless steel. This mirror is attached to the thermometer well base 24 and cooling tube 22 through a small copper stud 24'. This stud is about one-third the diameter of the mirror and is located in the center of the mirror. The mirror is cooled through its contact with this stud and, consequently is cooled more in the center than it is on its outer edges. As a result the dew deposits at a small central spot which is easily detected because of the contrast afforded between this spot and outer surface. The mirror is kept as thin as is consistent with good workmanship in order that the differential cooling of the center portion and outer portion of the mirror will be accentuated. The material commonly used for the mirror has been stainless steel. Platinum can be used, and other materials, of relatively low coefficient of heat transfer would be satisfactory. Less temperature differential between the central and outer portion of the mirror at the dew points would obtain if materials of high coefficient heat transfer were used. In order to retain a high degree of polish, the materials used should be non-corrosive.

In the construction of the device better results will be obtained if the mirror face is free of pits, flat and perpendicular to the axis of the thermometer-well and cooling tube. If it is desired to employ a stainless steel mirror a button thereof, about $\frac{1}{32}''$ thick and slightly oversize in diameter, may be silver soldered to the projecting nib on the thermometer-well before the thermometer-well is soft soldered (tin-lead) to the cooling tube. After soldering the thermometer-well to the cooling tube, a stainless steel mirror can be machined to the final dimensions desired and it has been found desirable to limit the thickness of the finished mirror to approximately $\frac{1}{64}''$. With a thicker mirror some loss in definition of the dew-point is experienced; and when the mirror is materially less than $\frac{1}{64}''$, there is some difficulty in maintaining a flat surface when it is polished. A good bond should be obtained between the mirror and the nib since cooling of the mirror takes place through this contact. An irregular bond may cause a corresponding irregularity or loss in definition of the initial dew deposit.

The cooling tube 22 as well as the fitting 24 is thermally insulated from its retaining nut 23 and the body of the apparatus by fiber spacers, bushings and gaskets 25, 25', 25'' and 25''' to minimize the dissipation of refrigeration being supplied by the chiller unit 19, by which the cooling tube is affected, and to concentrate the cooling effect on the mirror. The chiller unit 19 is suitably comprised of a copper body 19' with a brass header, 26 and 27, at the intake and exhaust ends. A number of small holes 28 are provided through the body 19' and connect the two headers whereby a cooling medium or gas may be passed through the chiller to effect a cooling of the mirror 14 by heat transfer from the chiller through the tube 22 and thence through the fitting 24 and its nib 24' to which the mirror is attached. The cooling tube 22 may be tapered on its outer end, as shown, to provide a good thermal contact between the same and a similarly tapered opening through the body 19' of the chiller unit. Such tapering also affords easy dismantling of the unit for inspection and cleaning. The means and method of cooling just described eliminates the necessity of circulating refrigerating fluids.

If it is desired to utilize a thermometer for temperature measurement it may be mounted in the cooling tube in a manner whereby the bulb thereof is entirely within the well 31 of the fitting 24. The stud 24' to which the mirror is soldered is a part of the base of the thermometer-well and since there is no metallic contact between the thermometer-well and the cooling tube other than through its base, the thermometer indicates the temperature of the mirror rather than some compromise temperature influenced by the temperature gradient along the cooling tube.

The window 15, of suitable transparent material, is positioned to permit direct visual observation of the mirror. This window, which must withstand the full gas pressure in the apparatus, may be successfully and suitably formed of "lucite," a transparent thermoplastic material developed rather recently by E. I. Du Pont de Nemours. The material is machined readily and has sufficient strength at ordinary temperatures to withstand the pressure for which the apparatus is built.

The design of the transparent window shown in the drawings will distribute the stresses that are set up when the window is subjected to pressure. The narrow shoulder 15' on the outer portion of the window normally should not contact the companion shoulder on the retaining nut. It serves merely as an additional support to arrest or retain the window should it deform or fracture in service.

It has also been found convenient to mount an adjustable observation mirror 29 in front of the window at such an angle as to permit observation of the mirror 14 through the window from a position that will also permit convenient reading of the thermometer which registers the mirror temperature. This arrangement also provides a safety factor in case of possible breakage of the window.

A deflecting nozzle or passageway 30 may be provided in the gas intake channel and so oriented as to direct the incoming gas directly toward the mirror.

For the insulating spacers, bushings and gaskets 25 etc., horn fiber, among other satisfactory materials, has been found suitable. If laminated material is used, care should be taken in machining the cup and ring gaskets to have the laminations perpendicular to the axis; otherwise they are apt to split. "Lucite" may be satisfactorily used as material for the split washer 25'' which goes underneath the mirror. This material is practically impervious to water, whereas, fiber has a tendency to swell when it gets wet and may cause distortion of the thin mirror.

In assembling the unit it is desirable that an annular space be left between the thermometer-well and the walls of the cooling tube. This construction assures that the thermometer will be cooled through the solder contact between the thermometer-well fitting and the cooling tube and will not be influenced unduly by the colder temperature prevailing in the cooling tube at a point some distance from the base of the thermometer well.

With respect to the construction of the rest of the apparatus, the dimensions or materials may be modified somewhat to suit local conditions.

The unit generally, except for the cooling tube and chiller, is preferably though not necessarily made of stainless steel to avoid corrosion by either condensed moisture or any corrosive gases that might be present, and preferably of such strength as to be suitable for use with safety at atmospheric temperatures, and at pressure up to approximately 2500 pounds per square inch. Apparatus of the character described has withstood hydrostatic pressure tests ranging as high as 5500 pounds per square inch, but it is recommended, as a safety factor, that the working pressure be limited to approximately one-half the hydrostatic test pressure. By suitably modifying the dimensions of the apparatus, however, it may be made suitable for use at higher pressures.

Operation and functions

Briefly, the operation of the apparatus involves: (1) cooling of a polished surface, which is in contact with the flowing gas, by means of the chiller unit, to that temperature at which condensation begins; (2) visually observing the condensate in the form of dew or frost on the mirror surface; and (3) observing the temperature at which the deposit appears and disappears, by such means as a thermometer.

In the operation of the device, the gas source is connected to valve 12 which is normally used as a shut-off valve and the control of the gas flow through the device is taken care of by the manipulation of valve 13. In case it is desired to determine the dew-point of gas at a pressure lower than the pressure of the source pressure, valve 12 may be manipulated to control the flow. Under such circumstances valves 12 and 13 may be manipulated in conjunction to establish the desired rate of flow through and the pressure within the device. The rate of gas flow through the apparatus, however, is not overly critical. It should, however, be kept relatively low yet high enough to obtain fairly prompt appearance and disappearance of the bloom on the mirror. With a little experience an operator will be able to determine what flow is most suitable for the prevailing conditions.

Many methods of cooling the outer portion of the cooling tube are satisfactory, however, and in the development of the apparatus a number of systems were used to provide the required refrigeration. For example, a copper rod may be drilled at one end and at right angles to the axis and the hole tapered to fit the taper on the cooling tube; the copper rod, attached to the cooling tube so that it extends vertically downward into an ice bath, and the cooling thus obtained transferred to the copper cooling tube. Adjustment of rate of cooling and the limit to which the mirror is to be cooled may be obtained by variation in the depth of the immersion of the copper rod in the ice bath. This arrangement is satisfactory within the range of temperature for which this method of cooling is suitable.

Another chiller arrangement which may be used comprises a container provided with means for suitably connecting the copper cooling tube and in which liquids may be placed and allowed to evaporate. In order to obtain sufficiently low temperatures, liquids having a fairly low boiling point are preferably used, such as alcohol, carbon tetrachloride, and gasoline. For the higher temperature dew point determinations water may sometimes be used. In order to cause the liquids to evaporate more readily, arrangements may be provided for bubbling gas or air through the liquids. This arrangement is also satisfactory within its limitations.

Still another chiller arrangement for supplying refrigeration to the copper cooling tube may comprise a gas throttling device whereby gas or air under pressure may be led through a heat exchanger and throttled at a point close to the copper cooling tube. By throttling the gas the temperature of the gas may be lowered due to the Joule-Thompson effect. The expanded gases passing out of the low pressure side of the heat exchanger precools the incoming gases and thus lowers the temperature which may be obtained by this method.

A most suitable chiller arrangement is that previously described in connection with the accompanying drawing. This arrangement permits a very compact and neat unit to be used. Low boiling point liquids which can be conveniently obtained under pressure in suitable containers are used to provide the refrigeration. A number of such liquids are available and will be satisfactory. Among these are carbon dioxide, butane, and propane. Liquid propane or mixtures of liquid propane and liquid butane are common to the gas industry and are usually readily available.

These liquids, under pressure, are throttled through valve 20 into the bottom header 26 of the chiller unit 19 and pass up through the holes 28. At atmospheric pressure, which prevails in the chiller, the boiling point of these liquids is lower than the temperature of the chiller. Under these conditions the liquid evaporates, and passes to the atmosphere through the exhaust port 21, and in doing so provide the refrigeration required. The chiller thus cooled reduces the temperature of the copper cooling tube 22 and by reason of heat transfer the cooling is transferred through the thermometer-well fitting 24, which is in contact with the end of the cooling tube, to the central portion of the mirror soldered to the stud 24' of the fitting 24. The temperatures which may be reached by this arrangement depend upon the normal (or atmospheric pressure) boiling point of the liquid used. Butane has a boiling point of approximately 32° F., propane approximately —40° F., and carbon dioxide a sublimation point of approximately —112° F. It has been found that it requires a temperature approximately 10° F. cooler in the chiller than at the mirror. The dew point commonly encountered in the natural gas industry reaches 32° F. frequently and sometimes reaches a temperature of 15° to 20° F.; consequently, liquid propane is generally more suitable. The design of the chiller is such that the vapors from the evaporating liquids pass upward through the body of the chiller through a number of small holes. By this arrangement the cold produced by the evaporating liquids is efficiently transferred to the body of the chiller and thence to the copper cooling tube.

In supplying refrigeration to the chiller it has been found desirable to throttle the liquefied hydrocarbon gases intermittently. The chiller unit has considerable mass and thus tends to smooth out the intermittent effect of this method of operation. By supplying the refrigeration in this manner, it is easier to judge the quantity of refrigeration supplied than by attempting to throttle the liquefied gas continuously. A momentary opening of the throttle valve usually is sufficient for one or two degrees lowering of the target mirror temperature.

Because of the high thermal conductivity of the copper cooling tube, the mirror is cooled below the temperature of its surroundings, and a cold spot is provided for the condensation of moisture. As has been stated, the mirror contacts the thermometer-well fitting through a stud which is only about one-third the diameter of the mirror. This arrangement tends to maintain the central portion of the mirror at a slightly lower temperature than the outer portion with the result that the dew first appears on the central portion of the mirror, and its detection is aided materially by the contrast afforded.

By soldering a thermocouple to the front face of the stud in place of the mirror, the closeness of agreement between the temperature indicated by the thermometer and the temperature of the copper stud, to which the mirror is attached may be determined. So long as the rate of temperature change does not exceed one or two degrees per minute the temperature difference between the thermometer and the thermocouple will probably not exceed 0.2° F. The temperature may be controlled within these limits by intermittent throttling of the liquid hydrocarbons through valve 20 of the chiller, allowing sufficient time between successive throttlings for temperature equilibrium to become established.

Although the precision or reproducibility of a dew-point apparatus of this type may be determined readily through its normal operation, the accuracy should be determined by special tests. In order to test the apparatus described, gas at various pressures may be bubbled through a water saturator, kept at controlled and measured temperatures, and after leaving the saturator, passed through the dew-point apparatus. Condensation of moisture or reduction of pressure in the connecting lines should be avoided. By careful manipulation of the device it will be found that dew-points can be duplicated to within 0.2° F., and in practice it has been found that the average of several such measurements did not differ from the saturator temperature by more than 0.2° F. No difficulty was experienced in making tests with the device where the dew-point was below 32° F. and dew-points as low as 3° F. below zero were readily determined by the apparatus.

In determining dew-points of natural gases, a very light deposit of oil sometimes appears on the mirror which may not disappear when the pressure is reduced within the apparatus by throttling with the inlet valve 12. Under circumstances where this oil deposit interferes seriously, it is advisable to remove the mirror assembly and wipe off the oil deposit with a clean cloth. The design of the apparatus permits this to be done readily.

The apparatus, is of course, capable of indicating the gasoline dew-point as well as the water dew-point, and with a little experience it is possible to differentiate readily between these dew-points. The gasoline dew is deposited as a very thin film that seems to wet the surface of the mirror and usually shows considerable iridescence, while the water dew, on the other hand, is deposited in tiny droplets which, under brightly lighted conditions, appear white, and when dimly lighted, appear darker than the outer portion of the mirror.

In most instances it is unnecessary to provide special illumination for the mirror. An extremely bright light in the apparatus has been found undesirable. When operating the unit at night, however, or in dark places, it sometimes is advantageous to use a small light for illuminating the mirror. This illumination is best obtained by holding the light near the eye and reflecting the light into the cell by shining it on the observation mirror 29. In obtaining suitable illumination, it is convenient to mount the unit on a tripod which permits orienting the apparatus for proper lighting. When thus mounted, connection to the gas source is preferably obtained through copper tubing.

The observation mirror 29 has been found very convenient in enabling the operator to see both the mirror and the thermometer from the same position, its adjustability permitting a selection of light intensities.

In the use of this equipment it is necessary to observe the usual precautions attendant to any type of dew-point determination. The more important of these are to make certain (1) that a proper sample is taken from the pipe line; (2) that the temperature of the sampling line is not below the temperature of the gas in the pipe line; (3) that the sampling line does not contain any condensed water; and (4) that there is no material reduction in pressure before the gas reaches the dew-point apparatus as well as while the gas is being passed through the apparatus.

The embodiment particularly described has demonstrated the practicability of a type which permits direct visual observation of the dew as compared with a type of device in which the dew is detected indirectly by reflected light or other means.

From the foregoing it will be seen that the dew-point apparatus herein described is suitable for use with gases under pressure; that the device is simple, readily portable, easily operated, and may be used with safety at pressures up to approximately 2500 pounds per square inch or higher if modified in construction; and that dew-points may be determined with an accuracy of 0.2° F.

What we claim is:

1. A device for indicating the dew-point temperature of gases under pressure comprising a body member having a chamber, said body member having a transparent wall portion through which interior portions of said chamber may be viewed, controllable means for conducting gases through said chamber, a visible reflecting surface of low thermal resistance within said chamber, means for differentially cooling said surface, pressure indicating means operatively associated with said chamber, and temperature indicating means associated with the lowest temperature area of said reflecting surface.

2. A device for indicating the dew-point temperature of a gas under pressure comprising the combination of chamber forming means, a plate-like member having a reflecting surface mounted within said chamber, means for causing a gas to flow under pressure across said surface, means for regulating and determining the pressure of the gas within said chamber, means in contact with the central portion only of said reflecting surface for differentially cooling the surface to a temperature at which a condensate forms on the central portion only of said surface, means whereby said surface may be observed through the wall of said chamber, and means for determining the temperature of the central portion of said surface.

3. In a dew-point indicator, the combination, with a thin polished metallic member, of means for accurately measurably cooling a portion of the polished face of said member, comprising a heat conductive body conductively secured to the back of said member behind said portion of the face thereof, said body having a well-like extension projecting opposite its point of securement to said member and a heat conductive flange extending outwardly from a point intermediate the point of securement and the well-like portion, a heat conductive element conductively related to said flange, a temperature indicating means operatively positioned in said well-like member, and means for controllably chilling said conductive element, whereby said polished member and temperature indicating means are concomitantly cooled by conduction through substantially equal conductive paths, producing extreme accuracy of relation between the indications of said indicating means and the actual temperature of said cooled portion of said polished face.

4. Means for determining the dew point of a gas under predetermined pressures which comprises a body member having a chamber, a plate-like member of low thermal resistance having a reflecting surface and mounted within said chamber, said chamber having a transparent wall portion opposite said reflecting surface and through which condensate formations on said surface may be observed, means for differentially cooling said reflecting surface to a temperature at which vapor condenses on a portion only of said surface to produce a readily discernible contrast between portions of said surface, temperature indicating means operatively associated with said reflecting surface for indicating the temperature of the portion on which condensate is formed, means for conducting gases into said chamber and directing the same against said reflecting surface, means for controlling the quantity and pressure of the gases flowing into said chamber, and pressure indicating means operatively associated with said chamber for indicating the pressures of the gases within said chamber.

5. Means for determining under predetermined pressures the temperature to which a gas undersaturated with respect to vapor may be cooled before the vapor will begin to condense which comprises a body member having a chamber, a reflecting surface within said chamber, controllable means for differentially cooling the reflecting surface to temperatures at which a condensate forms on the central portion only of said reflecting surface, transparent means in the wall of said body member whereby condensate formations on said reflecting surface may be observed, means for conducting gases into said chamber, temperature indicating means operatively associated with said reflecting surface for indicating the lowest temperature thereof, pressure indicating means operatively associated with said chamber for indicating the pressures of gases conducted thereinto, and an adjustable reflector whereby the formation of condensate on said reflecting means may be visualized through said transparent means from an angle from whence said temperature and pressure indicating means may be simultaneously observed.

6. A device for indicating the dew-point temperature of gases, hydrocarbons, gasoline and the like comprising the combination of a plate-like element of metal and having a reflecting surface to which dew will readily adhere, chiller means, metallic thermal conductive means connecting said chiller means and a central portion of said element for differentially cooling said central portion with respect to surrounding portions thereof to temperatures at which a condensate forms on the central portion only of said surface to afford immediate detection by contrast, temperature indicating means housed by said metallic thermal conductive means and operatively associated with said central portion for observing its temperature and changes therein during courses of dew-point determinations, a housing for said element, means for conducting an aforesaid substance into contact with the reflecting surface of said element, and observation means associated with said housing whereby the formation of dew on said central portion may be visualized from the exterior of the housing.

WM. M. DEATON.
ELLIS M. FROST, Jr.